United States Patent [19]

Calhoun

[11] Patent Number: 4,530,397
[45] Date of Patent: Jul. 23, 1985

[54] OIL SAVING APPARATUS FOR USE WITH WELL PUMP POLISH ROD

[75] Inventor: Gloria J. Calhoun, Buttonwillow, Calif.

[73] Assignee: H. C. Calhoun, a part interest

[21] Appl. No.: 480,763

[22] Filed: Mar. 31, 1983

[51] Int. Cl.³ .................. E21B 33/03; E21B 33/08
[52] U.S. Cl. ............................................ 166/84; 166/81
[58] Field of Search .............. 166/81, 82, 83, 84; 277/31, 24, 19, 20, 18, 17

[56] References Cited

U.S. PATENT DOCUMENTS

| | | | |
|---|---|---|---|
| 1,971,542 | 8/1934 | Taylor | 277/19 |
| 2,079,922 | 5/1937 | Owen | 166/84 |
| 2,163,327 | 6/1939 | Shaffer | 166/81 |
| 3,054,619 | 9/1962 | Pierotti | 277/59 |
| 4,321,975 | 3/1982 | Dyer | 166/84 |

Primary Examiner—Stephen J. Novosad
Assistant Examiner—Michael A. Goodwin
Attorney, Agent, or Firm—Harvey B. Jacobson

[57] ABSTRACT

Apparatus is disclosed for conserving oil which may leak from the stuffing box of an oil well pump polish rod by passage past the polish rod when the stuffing box packing wears or dries out. The apparatus comprises a housing attached to a stuffing box surface from which the polish rod emerges. The housing includes a chamber which collects leakage fluid and discharges it to a collection receptacle, auxiliary packing around the polish rod adjacent the collection chamber, and secondary discharge ducts for draining and collecting any leakage fluid which may pass through the collection chamber into the auxiliary packing.

9 Claims, 3 Drawing Figures

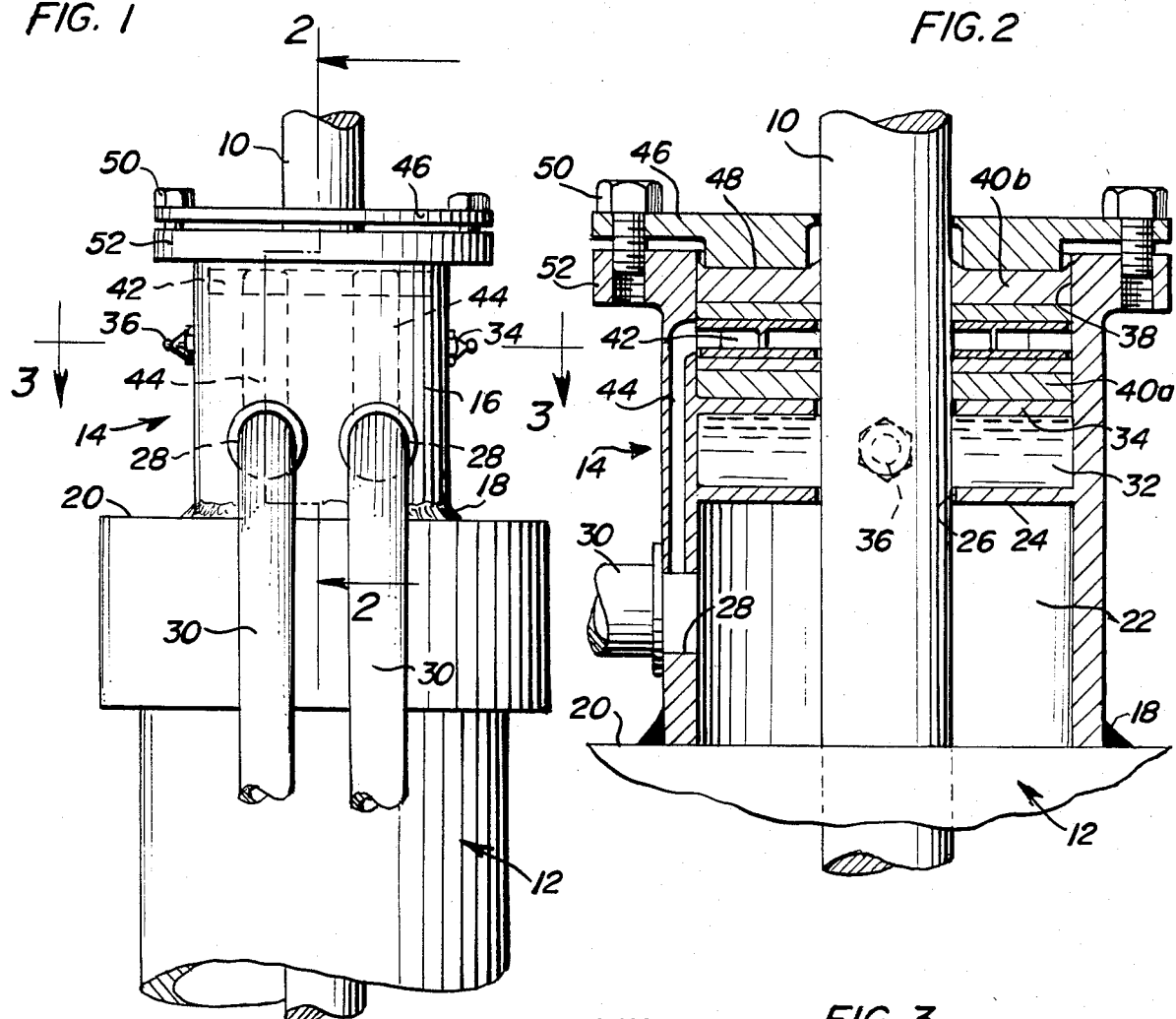
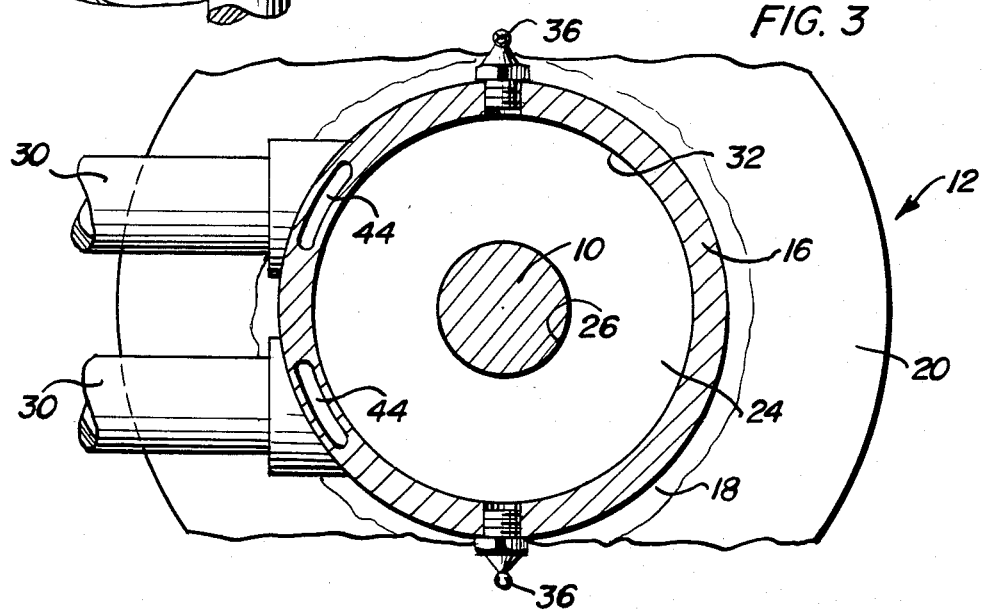

OIL SAVING APPARATUS FOR USE WITH WELL PUMP POLISH ROD

BACKGROUND OF THE INVENTION

The invention is concerned with apparatus for use in sealing the polish rod of an oil well or like pump.

Generally, the polish rod of an oil well pump emerges from a wellhead christmas tree or like fitting through a stuffing box or similar seal, the purpose of which is to prevent pressurized liquid which is being pumped out of the well from leaking past the polish rod. Typically stuffing boxes include some form of packing which sealingly engages the polish rod during reciprocation of the rod, thereby precluding the egress of fluid past the rod. However, with continued use, the packing may wear, or dry and harden in the case of lubricated packing materials, thereby breaking its effective seal with the polish rod and allowing leakage of the production fluid. Considerable quantities of production fluid may be lost in this manner before the packing material is replaced or restored.

The present invention provides oil saving apparatus which may be applied to a stuffing box or like sealing assembly for the polish rod of an oil well pump and the like to conserve production fluid in the event of leakage thereof past the seal provided by the stuffing box.

DESCRIPTION OF THE PRIOR ART

Applicant is aware of the following U.S. patents relating to stuffing boxes for different applications and to sealing devices used in oil wells and the like:

| | | |
|---|---|---|
| 806,489 | J. M. Peck | Dec. 5, 1905 |
| 1,547,411 | M. D. Corley | July 28, 1925 |
| 1,723,934 | A. G. Heggem | Aug. 6, 1929 |
| 2,005,259 | W. P. Guiberson | June 18, 1935 |
| 2,079,922 | F. M. Owen | May 11, 1937 |
| 2,685,465 | J. P. Ratigan | Aug. 3, 1954 |
| 2,743,122 | J. P. Ratigan | Apr. 24, 1956 |
| 2,848,257 | W. A. Moore | Aug. 19, 1958 |
| 3,054,619 | C. T. Pierotti | Sept. 18, 1962 |
| 3,523,691 | W. E. Holliman | Aug. 11, 1970 |
| 4,162,704 | A. W. Gunther | July 31, 1979 |

SUMMARY OF THE INVENTION

The invention contemplates the use, in conjunction with a well pump polish rod stuffing box or like seal, of an oil saving apparatus which includes a chamber adapted to collect fluid which may leak through the stuffing box past the polish rod, and discharge means communicating with the chamber for delivering fluid collected in the chamber to an external collection receptacle or the like.

Apparatus in accordance with the invention may, for example, take the form of a housing surrounding the polish rod and sealed at one end thereof to an adjustable cover plate of the stuffing box. The collection chamber may be disposed adjacent the cover plate, and the housing may include auxiliary packing adjacent its other end, which other end may be closed by an adjustable and removable cover plate for compressing the auxiliary packing. Further, the housing may include secondary discharge means for the delivery of fluid which may pass through the collection chamber into the auxiliary packing. The arrangement may be such that ready access may be obtained to the auxiliary packing simply by removal of the cover without the necessity for any further dismantling.

Apparatus in accordance with the invention may be incorporated in a stuffing box as manufactured or may be supplied as a fitting for attachment to existing stuffing boxes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of apparatus in accordance with the invention shown in conjunction with a well pump polish rod and stuffing box.

FIG. 2 is a sectional view on an enlarged scale, on line 2—2 of FIG. 1.

FIG. 3 is a sectional view on line 3—3 of FIG. 1.

DESCRIPTION OF THE PREFERRED EMBODIMENT

A portion of a well pump polish rod 10 is shown where it emerges from a wellhead fitting such as a christmas tree or the like, through a conventional stuffing box 12 or like seal. It is to be understood that stuffing box 12 may be of any conventional type known in the art for sealing the polish rod against egress of pumped well fluid. For example, the stuffing box may be of the type disclosed in the Ratigan or Holliman patents previously referred to.

As noted above, situations can arise in which production fluid may leak through the stuffing box past the polish rod, for example, in the event of packing wear in the stuffing box or loss of lubrication to the packing. To conserve production fluid in these circumstances, an oil saving apparatus 14 in accordance with the invention may be applied to stuffing box 12.

Apparatus 14 comprises a generally cylindrical housing 16 open at its lower end and which, in the illustrated embodiment, is secured, as by welding 18 to the upper surface 20 of a cover plate or the like of the stuffing box 12, around rod 10.

Internally, at its lower end, housing 16 defines a collection chamber 22, (FIG. 2) having an upper internal flange 24 with a central bore 26 for passage of rod 10. A pair of discharge port 28 formed in the housing communicate with chamber 22 and are associated with discharge tubes 30 or the like. The tubes may lead to a suitable fluid receptacle, not shown. Flange 24 defines the lower wall of a lubricant chamber 32 within the housing, the lubricant chamber having an upper wall defined by a further centrally bored internal flange 34. In use, the lubricant chamber may be filled with grease by means of grease fittings 36 or the like associated with the housing.

Above lubricant chamber 32, at its upper end, housing 16 defines an auxiliary packing chamber 38 in which are disposed a pair of auxiliary packing layers 40a, 40b, and a drainage ring 42 sandwiched between the respective layers. The packing layers may be of a conventional form of fluid absorbent packing material, such as felt or the like lubricated, in use, by grease from chamber 32. Ring 42 may comprise upper and lower plates which may be perforated, and radial walls between the plates defining a circumferential series of openings therebetween. These openings communicate with a pair of secondary discharge ducts 44 formed in housing 16 and communicating respectively with discharge ports 28 through the wall of the housing. Alternatively, ducts 44 may discharge independently of the discharge ports.

Housing 16 has a bolt-on cover 46, with an axial offset central area 48 for applying pressure to packing layers 40a, 40b by tightening bolts 50 which are screw threaded into external flange 52 on the upper end of housing 16 so as to form a tight seal around the polish rod and compensate for packing wear. It will be noted that in the illustrated construction, if it becomes necessary to inspect or replace the auxiliary packing layers, this may accomplished simply by removal of cover 46 without any further dismantling being necessary.

In operation, should any well fluid leak from stuffing box 12 past the polish rod, it may collect in chamber 22 and discharge through tubes 30 into the collection receptacle rather than being wasted as spillage. Further, the apparatus provides secondary protection against spillage by virtue of packing layers 40a, 40b, drainage ring 42, and discharge ducts 44, the purpose of which is to collect leakage fluid which may pass through the collection chamber into the auxiliary packing.

While the invention has been described in relation to apparatus which may be attached as a fitting to an existing stuffing box, clearly, it may also be incorporated, in manufacture, in an integrated stuffing box-oil saver assembly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for use in conserving well fluid which may leak from a stuffing box or like seal past a well pump polish rod normally sealed by the stuffing box or the like, the apparatus comprising a housing having an open end for sealed attachment to a surface of the stuffing box or the like from which the polish rod emerges, with the housing surrounding the rod, the housing defining an internal collection chamber adjacent said open end for collecting said fluid, and an internal packing chamber having an opening at the opposite end of the housing, auxiliary packing in said packing chamber for sealing around the polish rod, a removable cover for said opening at the opposite end of the housing, the cover being formed with a central polish rod opening and providing access to the packing when removed from the housing, primary discharge means for discharging fluid from said collection chamber to the exterior of the housing, secondary discharge means associated with the packing chamber separate from the polish rod opening in the cover for collecting fluid which may pass through the collection chamber and discharging same therefrom, and means connecting the secondary discharge means with the primary discharge means externally of the collection chamber.

2. Apparatus as claimed in claim 1 wherein the housing includes a lubricant chamber between the collection chamber and the packing chamber, wherein the secondary discharge means includes a fluid collector ring disposed in the auxiliary packing, and the means connecting the secondary discharge means with the primary discharge means comprises duct means extending through the housing from the exterior of the collection ring.

3. Apparatus as claimed in claim 1 wherein the cover includes internal means for applying pressure against the auxiliary packing for tightening same around the polish rod.

4. In combination with an oil well pump polish rod stuffing box or like seal, apparatus for conserving fluid which may leak from the stuffing box past the polish rod, the apparatus comprising a housing extending from and sealed to a surface of the stuffing box from which the polish rod emerges, in surrounding relation to the polish rod, the housing defining an internal fluid collection chamber adjacent said surface, auxiliary packing means associated with the housing adjacent said chamber for providing an auxiliary seal around the polish rod, and primary discharge means for delivering fluid collected in the collection chamber to a collection receptacle or the like externally of the housing, wherein the housing includes a packing chamber accommodating the auxiliary packing, a cover for the packing chamber with a central opening receiving the polish rod, and secondary discharge means associated with the packing chamber separate from the central opening for discharging fluid which may pass through the collection chamber to the exterior of the housing, wherein the auxiliary packing comprises a pair of packing layers and the secondary discharge means comprises a drainage ring disposed between said layers and discharge duct means providing communication between the interior of the packing chamber in the region of said ring and the exterior of the housing.

5. A combination as defined in claim 4 wherein the cover includes means for compressing the packing to tighten same around the polish rod.

6. A combination as defined in claim 4 wherein the housing includes a lubricant chamber between the collection chamber and the packing chamber.

7. Apparatus for use in conserving well fluid which may leak from a stuffing box or like seal past a well pump polish rod normally sealed by the stuffing box or the like, the apparatus comprising a housing having an open end for sealed attachment to a surface of the stuffing box or the like from which the polish rod emerges, with the housing surrounding the rod, the housing defining an internal collection chamber adjacent said open end for collecting said fluid, and an internal packing chamber having an opening at the opposite end of the housing, auxiliary packing in said packing chamber for sealing around the polish rod, a removable cover for said opposite end of the housing, the cover providing access to the packing when removed from the housing, primary discharge means for discharging fluid from said collection chamber to the exterior of the housing, and secondary discharge means associated with the packing chamber for collecting fluid which may pass through the collection chamber, wherein the auxiliary packing comprises a pair of packing layers and the secondary discharge means comprises a drainage plate between the layers and duct means providing communication between the interior of the packing chamber in the region of said plate and the exterior of the housing.

8. Apparatus as claimed in claim 7 wherein the duct means communicates with the primary discharge means.

9. Apparatus as claimed in claim 8 wherein the primary discharge means comprises at least one port formed through a wall of the housing, and the duct means includes at least one duct formed in the wall of the housing connecting the interior of said packing chamber to said port.

* * * * *